United States Patent
Li et al.

(10) Patent No.: US 10,785,000 B2
(45) Date of Patent: Sep. 22, 2020

(54) SCHEDULING RESOURCES FOR ORTHOGONAL FREQUENCY DIVISION MULTIPLE ACCESS UPLINK TRANSMISSIONS

(71) Applicant: Intel IP Corporation, Santa Clara, CA (US)

(72) Inventors: Qinghua Li, San Ramon, CA (US); Xiaogang Chen, Portland, OR (US); Laurent Cariou, Portland, OR (US); Chittabrata Ghosh, Fremont, CA (US); Robert Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/005,267

(22) Filed: Jun. 11, 2018

(65) Prior Publication Data

US 2019/0044674 A1 Feb. 7, 2019

Related U.S. Application Data

(63) Continuation of application No. 15/088,932, filed on Apr. 1, 2016, now Pat. No. 9,998,263.

(60) Provisional application No. 62/203,272, filed on Aug. 10, 2015.

(51) Int. Cl.
*H04L 5/00* (2006.01)
*H04L 27/26* (2006.01)

(52) U.S. Cl.
CPC .......... *H04L 5/0037* (2013.01); *H04L 5/0051* (2013.01); *H04L 5/0094* (2013.01); *H04L 27/2613* (2013.01); *H04L 27/2666* (2013.01)

(58) Field of Classification Search
CPC .... H04W 84/12; H04W 72/12; H04B 7/0452; H04L 27/26; H04L 5/00
See application file for complete search history.

(56) References Cited

U.S. PATENT DOCUMENTS

| | | | |
|---|---|---|---|
| 2016/0156497 A1* | 6/2016 | Yang | H04B 7/0452 370/328 |
| 2016/0285608 A1* | 9/2016 | Kwon | H04L 5/0055 |
| 2017/0181102 A1* | 6/2017 | Bharadwaj | H04W 52/146 |

* cited by examiner

*Primary Examiner* — Jamal Javaid
(74) *Attorney, Agent, or Firm* — Eversheds Sutherland (US) LLP

(57) ABSTRACT

This disclosure describes systems, methods, and devices related to a flexible connectivity framework. A first device may send a trigger frame to a second device. The first device may then receive an uplink bandwidth resource request from the second device. The first device may detect a high efficiency-long training field (HE-LTF) in the uplink bandwidth resource request. The first device may send an uplink multiuser trigger frame, and the first device may receive an uplink frame from the second device.

14 Claims, 12 Drawing Sheets

_US 10,785,000 B2_

SCHEDULING RESOURCES FOR ORTHOGONAL FREQUENCY DIVISION MULTIPLE ACCESS UPLINK TRANSMISSIONS

CROSS REFERENCE TO RELATED APPLICATION

This application is a continuation of U.S. patent application Ser. No. 15/088,932 filed on Apr. 1, 2016, which claims the benefit of U.S. Provisional Patent Application No. 62/203,272 filed on Aug. 10, 2015, the disclosures of which are incorporated herein by reference in their entireties.

TECHNICAL FIELD

This disclosure generally relates to systems and methods for wireless communications and, more particularly, to uplink bandwidth request transmissions sent to an access point (AP) on a shared resource unit using cyclic shift diversity values.

BACKGROUND

Under development is a new IEEE 802.11ax standard, known as high efficiency wireless local area network (HEW), that is aimed to enhance Wi-Fi performance in indoor and outdoor scenarios. New HEW features are introduced to improve the spectral efficiency and user throughputs of Wi-Fi in dense deployments. These new features will involve changes to the physical (PHY) and medium access control (MAC) layers.

DETAILED DESCRIPTION

Figure 1:
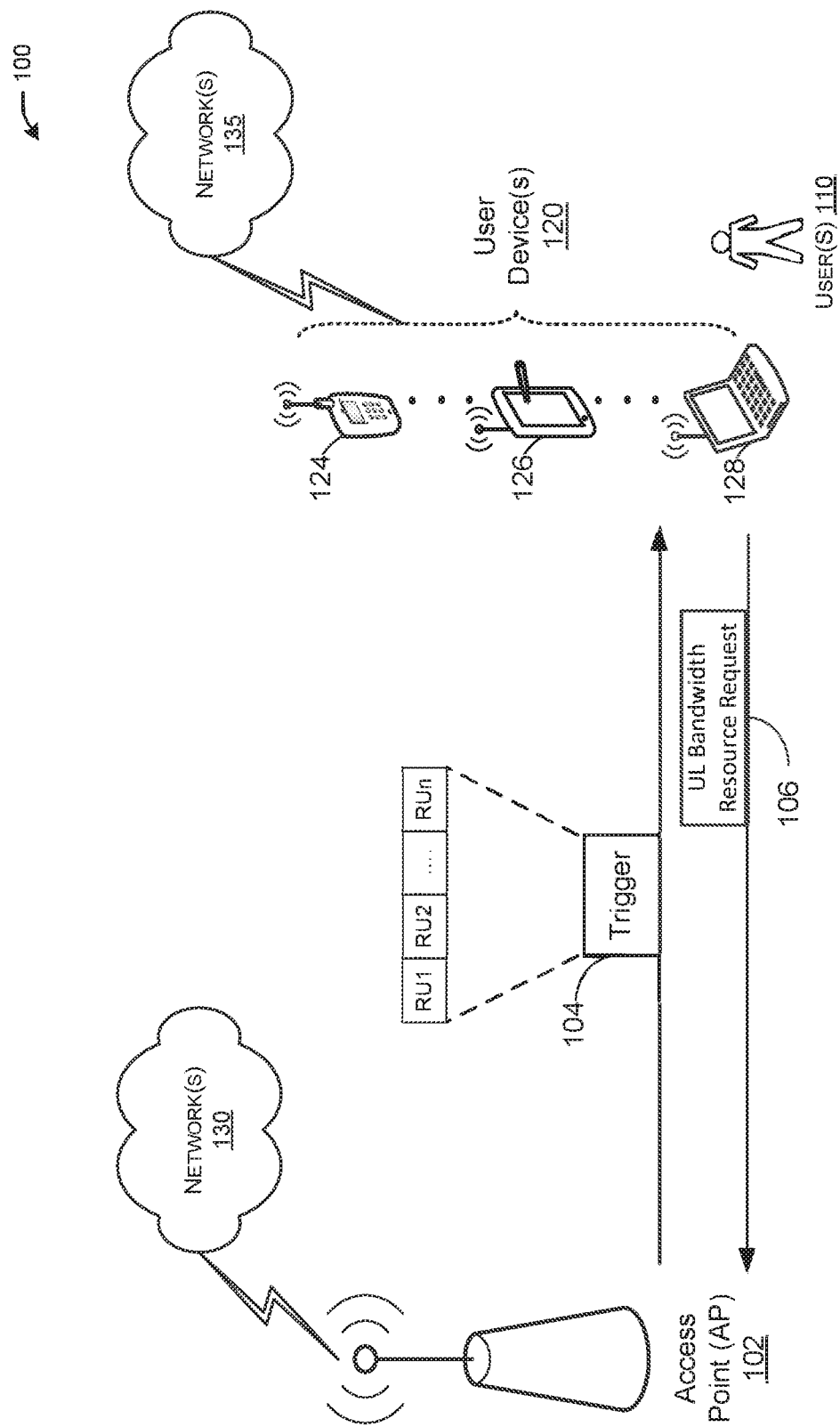
FIG. 1 depicts a network diagram illustrating an example network environment of an illustrative orthogonal frequency division multiple access (OFDMA) uplink resource unit allocation architecture, in accordance with one or more embodiments of the disclosure.

Example embodiments described herein provide certain systems, methods, and devices for providing a framework for flexible connectivity between wireless devices.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A design target for the HEW standard is to adopt methods to improve the efficiency of Wi-Fi, and specifically the efficiency in dense deployments of Wi-Fi devices, in places such as malls, conference halls, and public spaces where there may be several devices connected to a single access point. HEW devices may use OFDMA-based distributed channel access (ODCA) techniques to access a downlink and uplink channel. The uplink channel may be a channel accessed by at least one device to send data to an AP, and the downlink channel may be a channel accessed by the AP to send data to at least one of the devices.

On the uplink channel based on ODCA, at least one user device may be communicating with the AP and may be competing to access the channel with other devices in a random channel access manner. For example, at least two devices may access the channel to send an uplink bandwidth request at approximately the same time. In such a scenario, the uplink bandwidth requests from the at least two devices may collide before they reach the AP thereby making it difficult for the AP to distinguish between the uplink bandwidth requests. To prevent this from happening, each device may wait a random period of time before attempting to access the channel again to send its corresponding uplink bandwidth request. This may result in further collisions resulting in some devices unsuccessfully attempting to access the channel in perpetuity.

On the downlink channel based on ODCA, the AP may send a trigger frame to the at least one device to prompt the device to send uplink bandwidth requests. The trigger frame may comprise a preamble along with other signaling, such as resource allocation, to coordinate the timing of the uplink bandwidth requests of the devices. For example, the trigger frame may comprise one or more resource units (RUs).

With ODCA, the AP transmits a trigger frame allocating the resources. The resources may be in time and/or frequency domain. Individual devices may use the allocated resource (e.g., 2 MHz of spectrum in a particular portion of a communication channel) to transmit their data to the AP. Therefore, with this approach, the devices may only transmit a narrow bandwidth signal in response to a trigger frame. However, the AP may not know which devices are transmitting or how many have data to send. Consequently, the AP may not assign the resources based on, for example, cyclic shift diversity (CSD) values, for the devices requesting resources to transmit their data. Because the devices share the same frequency resource unit (RU), the devices need to use different CSD values to tune the AP's automatic gain control (AGC) in order to distinguish the requests from different devices.

Example embodiments of the present disclosure relate to systems, methods, and devices for an OFDMA uplink resource allocation framework that may enable two-phase uplink (UL) multi-user (MU) transmissions, a resource allocation phase, and a data transmission phase. The resource request phase may be triggered by the AP, where the AP may poll the devices to send a specific signal using UL OFDMA if the devices want to have a transmit opportunity in the data transmission phase or in future UL MU transmissions. In one embodiment, the characteristics of the signal sent by the devices may enable the AP to identify the devices. For example, the AP may determine whether the devices are associated devices or unassociated devices and whether the signal has random access characteristics. An associated device is a device that may be assigned to a basic service set (BSS) and therefore uses a BSSID to transmit data on an uplink. An unassociated device may be a device that is not assigned to a BSS and therefore does not use a BSSID to transmit data on an uplink. In some embodiments, a signal may be defined as a code sequence (line of the P-matrix) of the high-efficiency long training field (HE-LTF) sent on a resource unit in frequency (26 tones allocation) using UL OFDMA. This combination of a code and a frequency resource unit may be associated with an ID, which is called the resource block ID (RBID). The AP may determine the identity of the device based on the energy detection of the code and frequency unit (e.g., RBID). The AP can acknowledge to the devices that it received the resource requests. The data transmission phase is a scheduled UL MU transmission, which may start with the AP sending a trigger frame to announce the identity of the devices that will transmit in the UL MU transmission, and other information like the allocated resources.

In some embodiments, a device's uplink transmission may be sent without interfering with other uplink transmissions of other devices using the same frequency RU on a communication channel. Each device may utilize one or more contention resource elements (CREs) to contend for the communication channel when a device wants to make an uplink transmission. The CREs may be a frequency-time-space code unit, or a frequency-time code unit, that enables, at least in part, a device to send its uplink transmission. Therefore, a CSD value may be assigned to both units. If a device selects a CRE to send a signal requesting an uplink bandwidth, the device may use the CSD value assigned to the CRE. Alternatively, a range of CSD values may be defined ahead of time and programmed into the devices, by a user, thereby allowing the devices to randomly select a CSD value. In some embodiments, the AP may broadcast the CSD values to be used by the devices instead of the devices determining a CSD value. The content of the uplink bandwidth request may comprise three phases. One phase may be a high efficiency-short training field (HE-STF), a second phase may be a high efficiency-long training field (HE-LTF), and a third phase may be a high efficiency data field. It is understood that the above descriptions are for purposes of illustration and are not meant to be limiting.

FIG. 1 is a network diagram illustrating an example network environment of an illustrative orthogonal frequency division multiple access (OFDMA) uplink resource unit allocation architecture, according to some example embodiments of the present disclosure. Wireless network 100 may include one or more user devices 120 and one or more access point(s) (APs) 102, which may communicate in accordance with IEEE 802.11 communication standards, including IEEE 802.11ax (HEW). The user device(s) 120 may be mobile devices that are non-stationary (e.g., not having fixed locations) or may be stationary devices.

Figure 11:
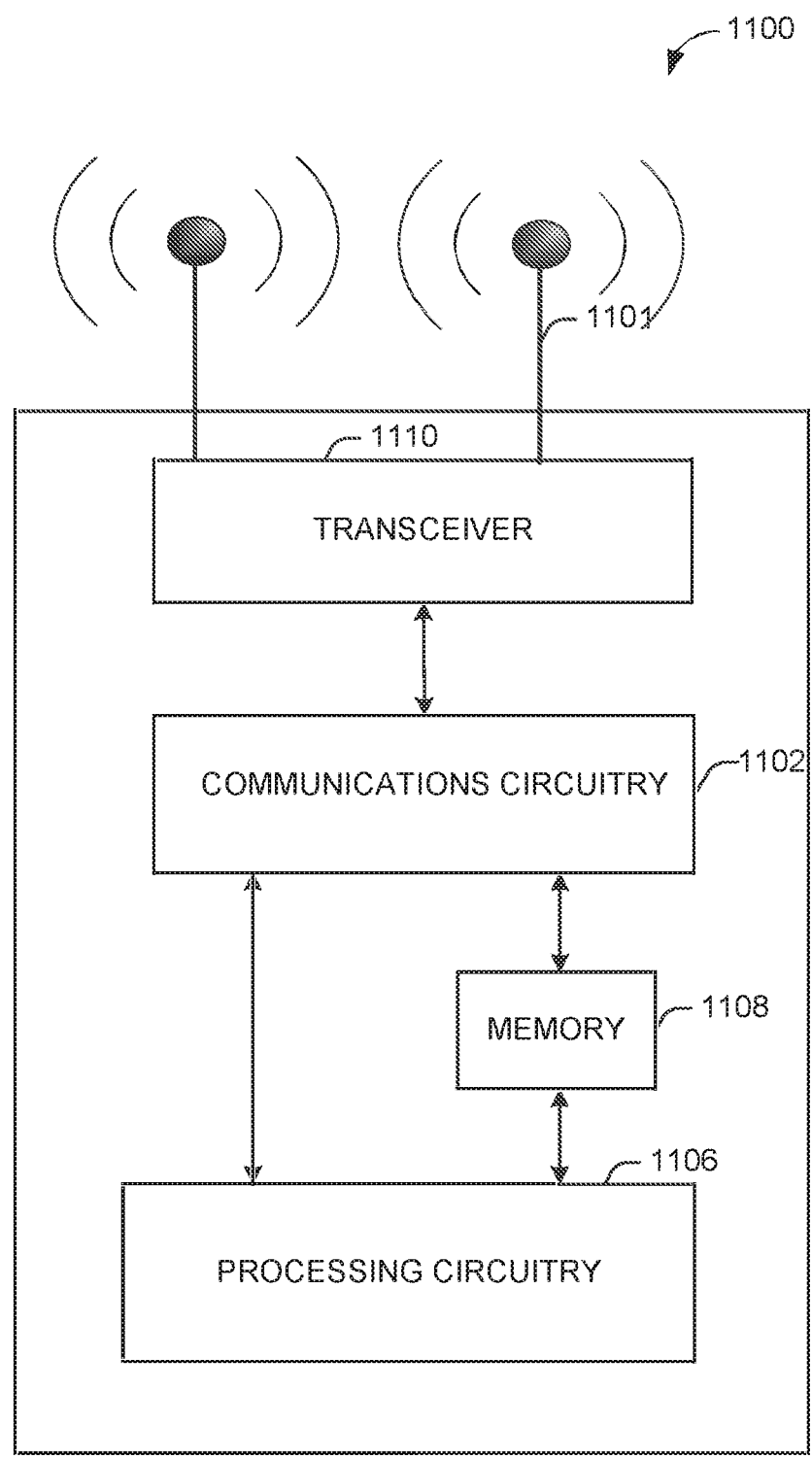
FIG. 11 illustrates a functional diagram of an example communication device that may be suitable for use as a device, in accordance with one or more example embodiments of the disclosure.
Figure 12:
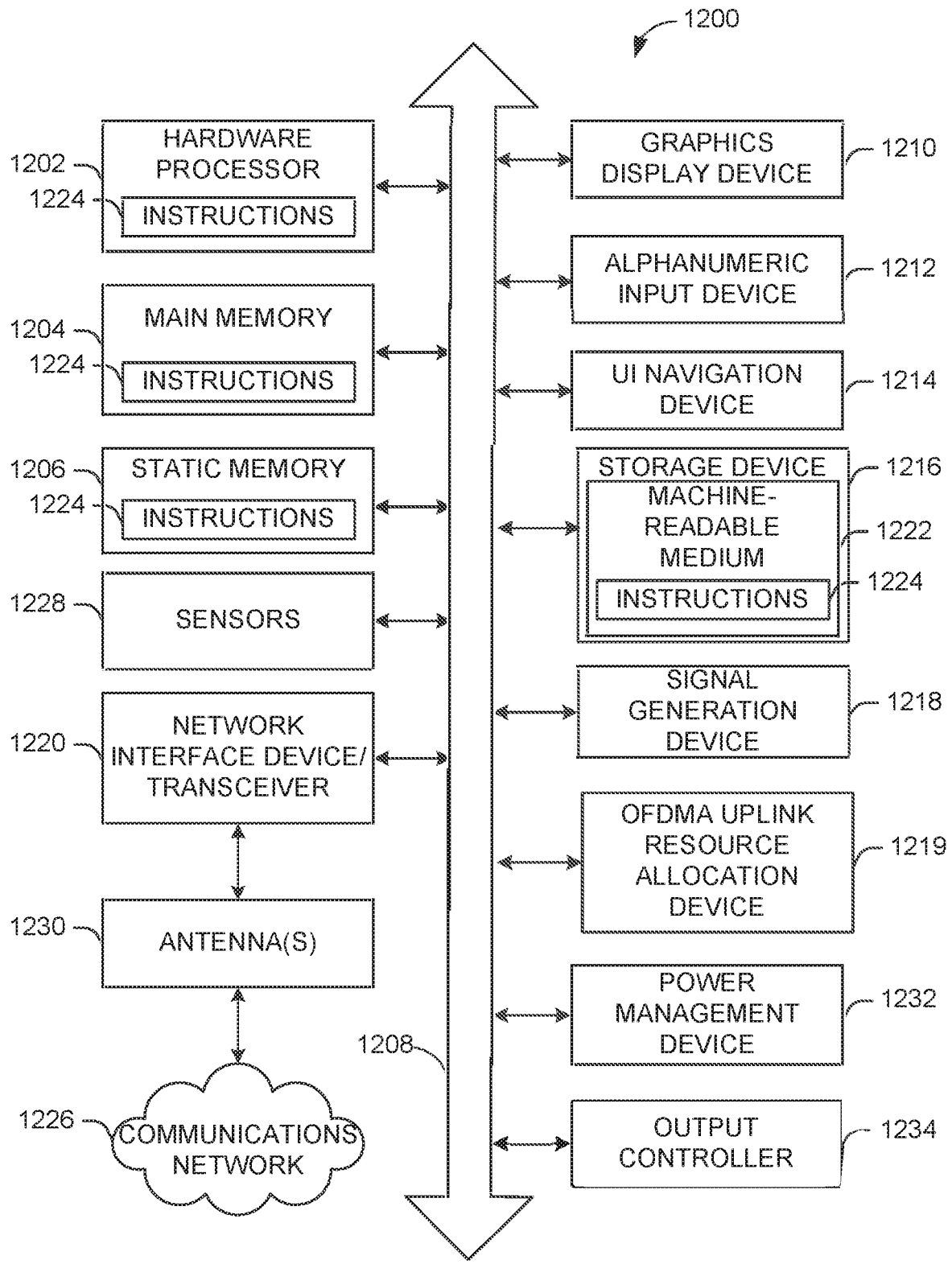
FIG. 12 illustrates a block diagram of an example machine upon which any of one or more techniques (e.g., methods) may be performed, in accordance with one or more embodiments of the disclosure.

In some embodiments, the user device(s) 120 and the AP 102 can include one or more computer systems similar to that of the functional diagram of FIG. 11 and/or the example machine/system of FIG. 12.

One or more illustrative user device(s) 120 may be operable by one or more user(s) 110. The user device(s) 120 (e.g., 124, 126, or 128) may include any suitable processor-driven user device including, but not limited to, a desktop user device, a laptop user device, a server, a router, a switch, an access point, a smartphone, a tablet, a wearable wireless device (e.g., a bracelet, a watch, glasses, a ring, etc.) and so forth. Any of the user devices 120 (e.g., 124, 126, or 128) may be configured to communicate with each other and any other component of the wireless network 100 via one or more communications networks 130 and 135 wirelessly or wired.

Referring to FIG. 1, there is shown a network diagram illustrating an example wireless network 100 for an OFDMA uplink resource allocation system, according to some example embodiments of the present disclosure. In this environment, the user devices 120, including the HEW user devices, may communicate with each other and transmit data on an operating channel. These user devices may randomly access the operating channel to transmit their data. However, there may be situations where the user devices may access the operating channel using assigned (or scheduled) resource units.

In the case of random access, an access point (e.g., the AP 102) may send a random access trigger frame (e.g., the trigger frame 104) indicating that the resource units are available for random access such that the random access resource units may be selected by the user devices (e.g., the user devices 124, 126, and/or 128) to send and/or receive data. The resource units may be represented by RU1, RU2, . . . , RUn, where "n" is an integer. These resource units may be arranged in a sequence such that a user device may determine which resource unit was selected when the user device is ready to transmit its data. These resource units may be resources in time domain, frequency domain, or a combination of time and frequency domains. The user device may use one of these resource units in order to send data to an access point (e.g., the AP 102). Consequently, when a user device 120 detects the trigger frame 104, the user device 120 may identify it as a random access trigger frame. This may be achieved by the access point setting an identifier in the trigger frame or by other means to flag the trigger frame as a random access trigger frame. The user device 120 may then select a resource unit from the resource units referenced in the trigger frame 104 by which to transmit an uplink bandwidth request to the AP 102 in UL bandwidth resource request 106. The selection of the resource unit may be done by employing various embodiments of the present disclosure.

The user device(s) 120 may be assigned one or more resource units or may randomly access the operating channel. It is understood that a resource unit may be a bandwidth allocation on an operating channel in a time and/or frequency domain. For example, with respect to the AP assigning resource units, in a frequency band of 20 MHz, there may be a total of nine resource units, each of the size of a basic resource unit of 26 frequency tones. The AP 102 may assign one or more of these resource units to one or more user device(s) 120 to transmit their uplink data.

In accordance with some IEEE 802.11ax (HEW) embodiments, an AP 102 may operate as a master device which may be arranged to contend for a wireless medium (e.g., during a contention period) to receive exclusive control of the medium for an HEW control period. The master device may transmit an HEW master-sync transmission at the beginning of the HEW control period. During the HEW control period, the HEW devices (e.g., the user devices 120) may communicate with the master device in accordance with a non-contention-based multiple access technique. This is unlike conventional Wi-Fi communications in which devices communicate in accordance with a contention-based communication technique, rather than a multiple access technique. During the HEW control period, the master device may communicate with HEW devices using one or more HEW frames. Furthermore, during the HEW control period, legacy devices refrain from communicating. In some embodiments, the master-sync transmission may be referred to as an HEW control and schedule transmission.

Any of the communications networks 130 and 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., the user devices 124, 126, 128), and the AP 102 may include one or more communications antennas. A communications antenna may be any suitable type of antenna corresponding to the communications protocols used by the user device(s) 120 (e.g., the user devices 124, 126, and 128), and the AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., 124, 126, or 128) and the AP 102 may include any suitable radio and/or transceiver for transmitting and/or receiving radio frequency (RF) signals in the bandwidth and/or channels corresponding to the communications protocols utilized by any of the user device(s) 120 and the AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n), 5 GHz channels (e.g., 802.11n, 802.11ac), or 60 GHz channels (e.g., 802.11ad). In some embodiments, non-Wi-Fi protocols may be used for communications between devices, such as Bluetooth, dedicated short-range communication (DSRC), ultra-high frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

Figure 2:
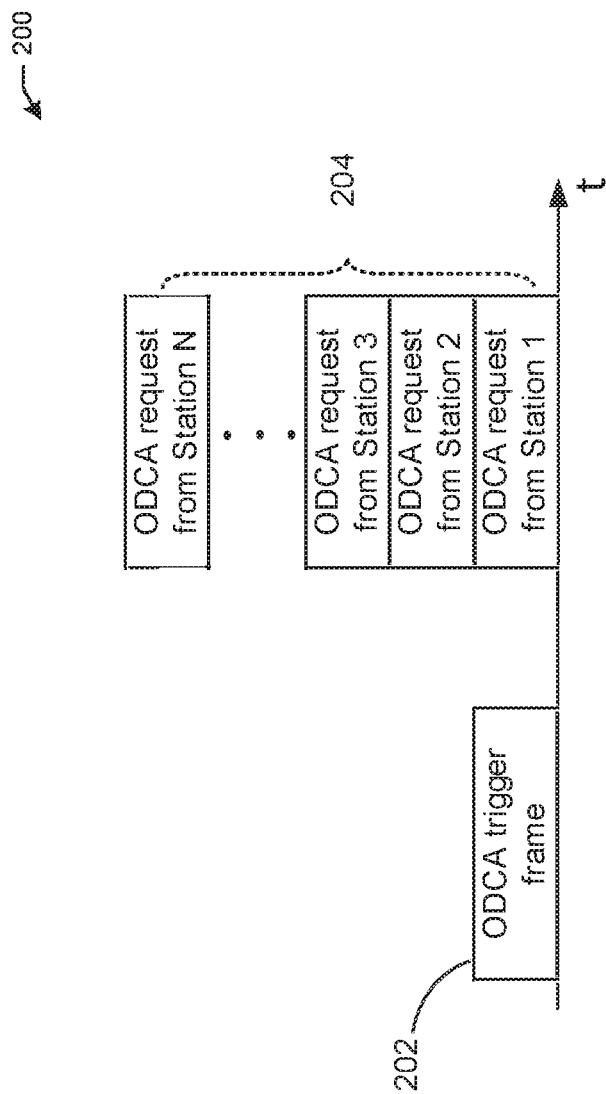
FIG. 2 depicts an illustrative schematic diagram of resource allocation requests in an OFDMA uplink resource unit allocation system, in accordance with one or more embodiments of the disclosure.

FIG. 2 depicts an illustrative schematic diagram of resource allocation requests in an OFDMA uplink resource allocation system, in accordance with one or more embodiments of the disclosure. An access point may send ODCA trigger frame 202 at some time before ODCA station requests 204 are sent to the access point from one or more devices in response to the ODCA trigger frame 202. The ODCA station requests 204 may contain one or more ODCA requests each of which may be sent from an individual device. Under normal ODCA operation, if multiple devices submit ODCA requests (e.g., uplink resource requests) at the same time, and the devices are approximately equidistant from the access point, the access point may not be able to differentiate one request from the others because they will arrive at the access point at the same time. The requests may collide thereby preventing the devices from successfully sending their requests to the access point. If the devices use the systems and methods disclosed herein however, the requests will not collide even if the devices are equidistant from the access point and they submit their requests at the same time.

Figure 3:
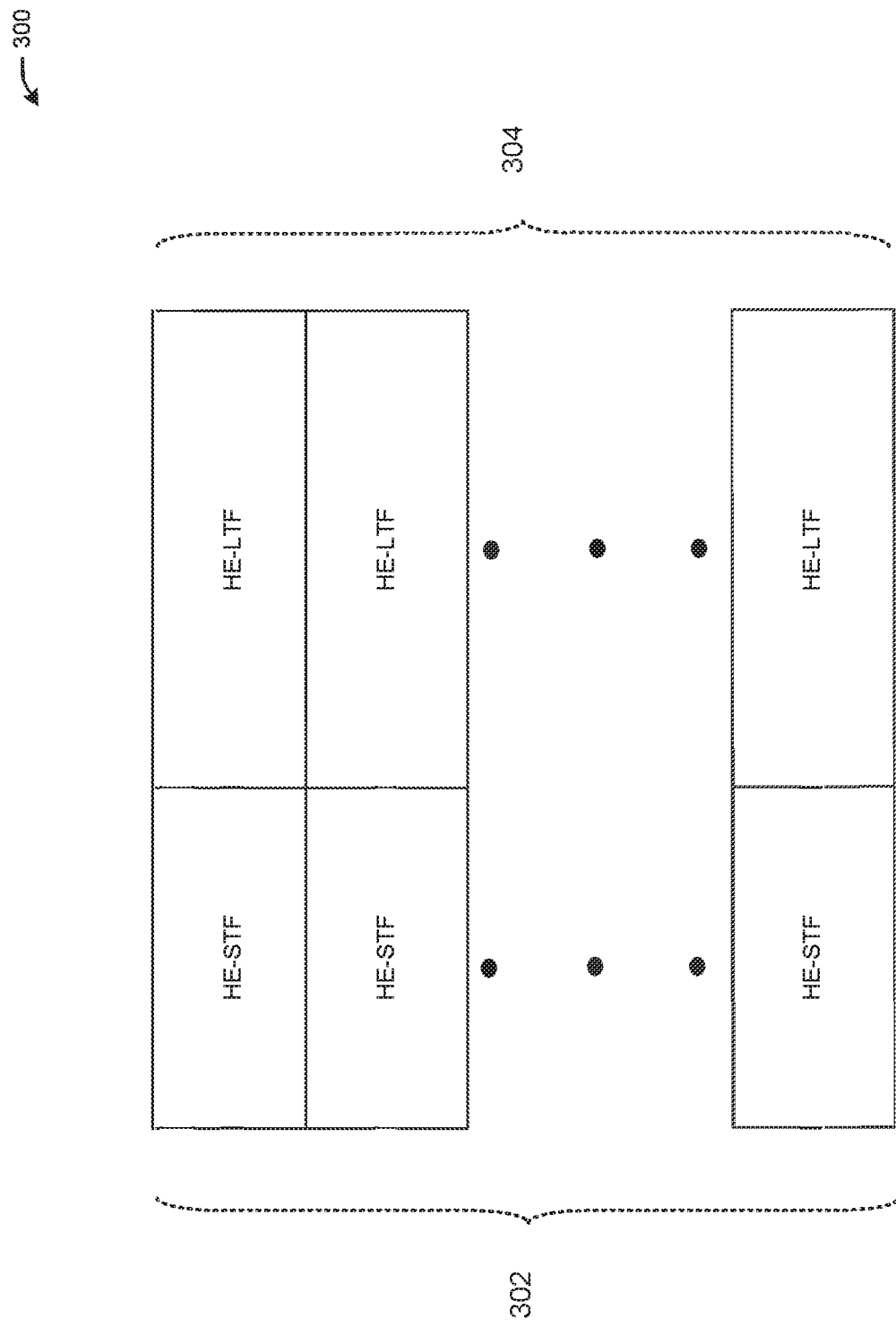
FIG. 3 depicts an illustrative schematic diagram of an uplink bandwidth request, in accordance with one or more embodiments of the disclosure.

FIG. 3 depicts an illustrative schematic diagram of an uplink bandwidth request, in accordance with one or more embodiments of the disclosure.

The uplink bandwidth request may comprise two phases. The first phase may comprise at least two devices sending high efficiency short training fields (HE-STFs) 302. The second phase may comprise the at least two devices sending high efficiency long training fields (HE-LTFs) 304. In general, there may be n devices, wherein n is any natural number, that send HE-STF and HE-LTF fields to an AP. The HE-STF may be sent by the devices so that the AP can adjust the automatic gain control (AGC) of its antenna to receive a signal from the corresponding device. The signal sent by a device in the HE-LTF may be used by the AP to train a receiver in the AP to adjust to the channel between the device and the AP, in order to detect the uplink bandwidth request. For example, the HE-LTF may contain information about the impulse response in the time domain of the channel or the frequency response in the frequency domain, or information about both that the AP may use in order to separate the signal sent by the device from the noise produced by the environment between the device and the access point. If the AP has multiple receiving antennas, it may use uplink multiuser multiple input multiple output (MU-MIMO) for receiving data from different devices. If an AP has multiple receiving antennas, the HE-LTF may be in the format of an uplink MU-MIMO channel training, which consists of orthogonal codes (e.g., P-matrix codes) applied across OFDMA symbols. The OFDMA symbols may be represented by the time access in FIG. 3. If data from the requesting devices is sent simultaneously and the AP has multiple antennas, it will use an estimate of the spatial channels corresponding to the different devices, to separate and receive the data from the different devices, respectively.

HE-LTF 304 may comprise a content resource element (CRE) which is a frequency-time-space and/or a frequency-time-code unit that each device transmitting an uplink bandwidth request may use to identify itself with the AP. For example, the CRE may be represented by a code in the frequency domain and/or time domain. In some embodiments, a frequency band may be divided into multiple resource units (RUs) for a requesting device to select. The RUs may correspond to frequencies over which an HE-LTF may be assigned, and may be used by a device to send an uplink bandwidth request as explained below in FIG. 4.

Figure 4:
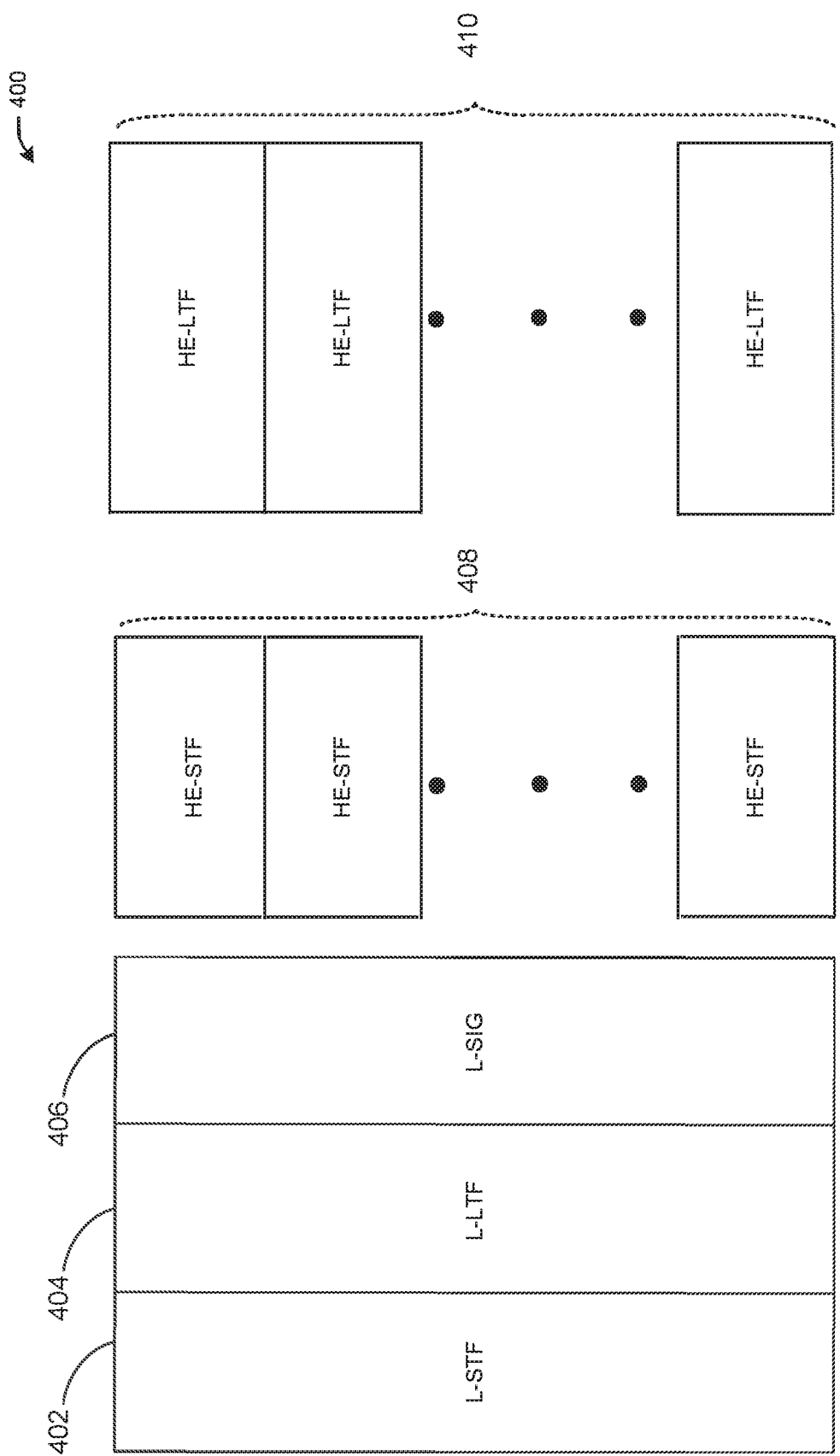
FIG. 4 depicts an illustrative schematic diagram of an uplink bandwidth request, in accordance with one or more embodiments of the disclosure.
Figure 5:
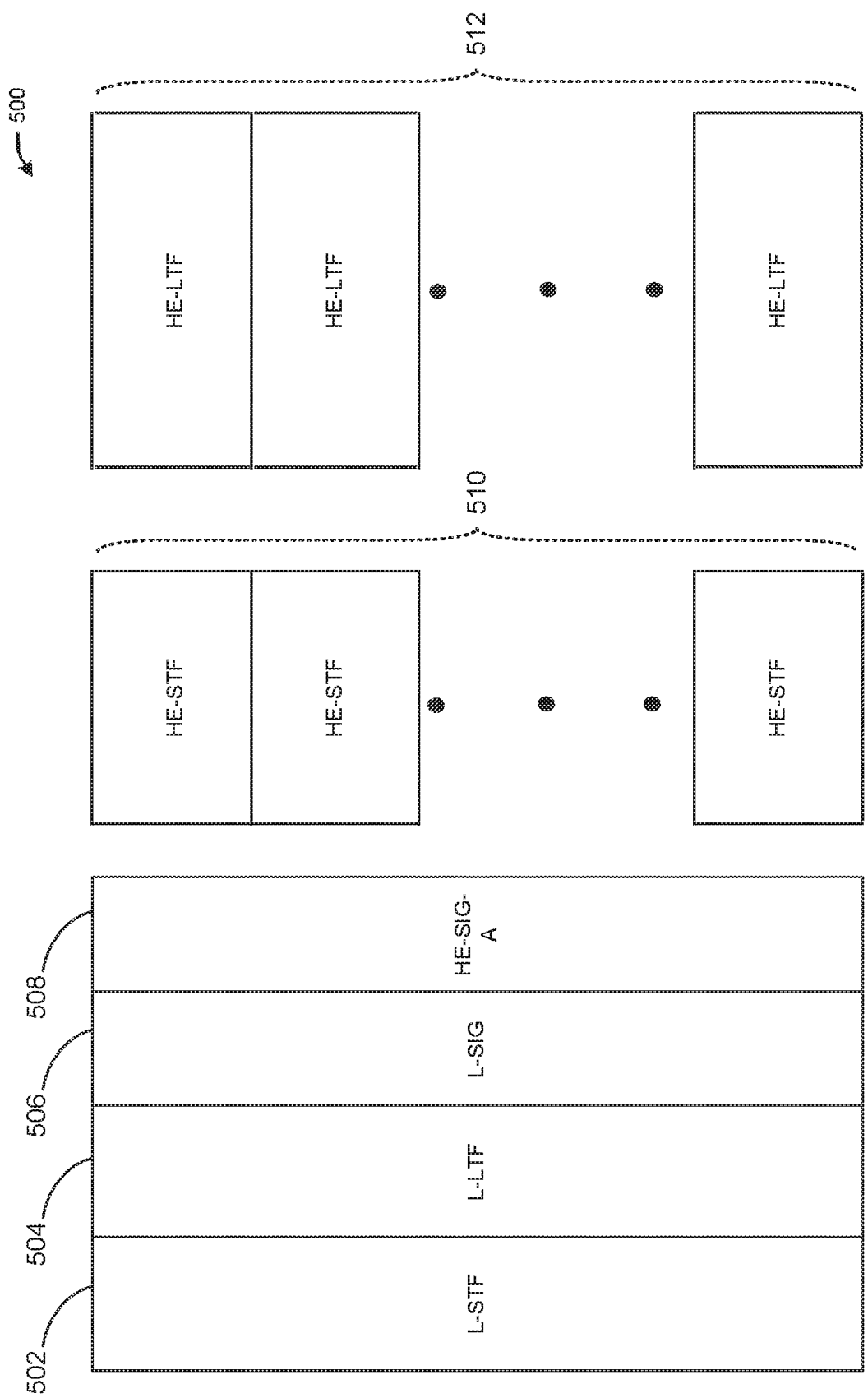
FIG. 5 depicts an illustrative schematic diagram of an uplink bandwidth request, in accordance with one or more embodiments of the disclosure.

In some embodiments, a legacy preamble may be sent before the HE-STF as shown in FIG. 4. The legacy preamble may include a legacy short training field (L-STF) (e.g., the L-STF 402), a legacy long training field (L-LTF) (e.g., the L-LTF 404), and a legacy signal (L-SIG) (e.g., the L-SIG 406) field. The HE-STFs 408 and the HE-LTFs 410 may be equivalent to the HE-STFs 302 and the HE-LTFs 304. The L-STF 402 may comprise fields similar to those in the HE-STFs 408, but the L-STF 402 may be used by legacy devices and the HE-STFs 408 may be used by high efficiency devices. The L-LTF 404 may comprise fields similar to those in HE-LTFs 410, but the L-LTF 404 may be used by legacy devices and the HE-LTFs 410 may be used by high efficiency devices. The legacy preamble is for holding the transmission of legacy devices (e.g., physical layer spoofing). In some embodiments, a high efficiency signal A field (HE-SIG-A) (e.g., the HE-SIG-A 508) may also be sent after a legacy signal (L-SIG) field (e.g., the L-SIG 506) as illustrated in FIG. 5. The HE-SIG-A field may comprise a control information subfield including, but not limited to, the frequency band over which a device is transmitting, and a group identification (ID) identifying a group of devices to which the requesting device belongs to, requesting an uplink bandwidth request or a device ID identifying the requesting device. The HE-SIG-A field may also comprise a stream information subfield indicating the number of locations of spatial streams that may be used by the requesting device or a group of devices to which the requesting device belongs to. The HE-SIG-A field may further comprise an uplink indication subfield indicating whether a physical protocol data unit (PPDU) that is carrying the HE-SIG-A field and any subsequent fields is destined for an AP. The HE-SIG-A field may also comprise a multiuser (MU) information subfield, indicating whether a PPDU is a single user (SU) MIMO (SU-MIMO) PPDU or a multiuser (MU) MIMO (MU-MIMO) PPDU. The HE-SIG-A field may also comprise a guard interval indication subfield indicating whether a short or long guard interval is used in the PPDU, an allocation subfield indicating a band or channel (subchannel index or subband index) allocated to each device in a bandwidth over which a PPDU may be transmitted by the device, and a transmission power subfield indicating a transmission power level for each channel identified in the allocation subfield. The HE-SIG-A field may be used by high efficiency devices.

HE-STFs 510 and HE-LTFs 512 may be equivalent to HE-STFs 302 and 408 and HE-LTFs 304 and 410 respectively.

Figure 6:
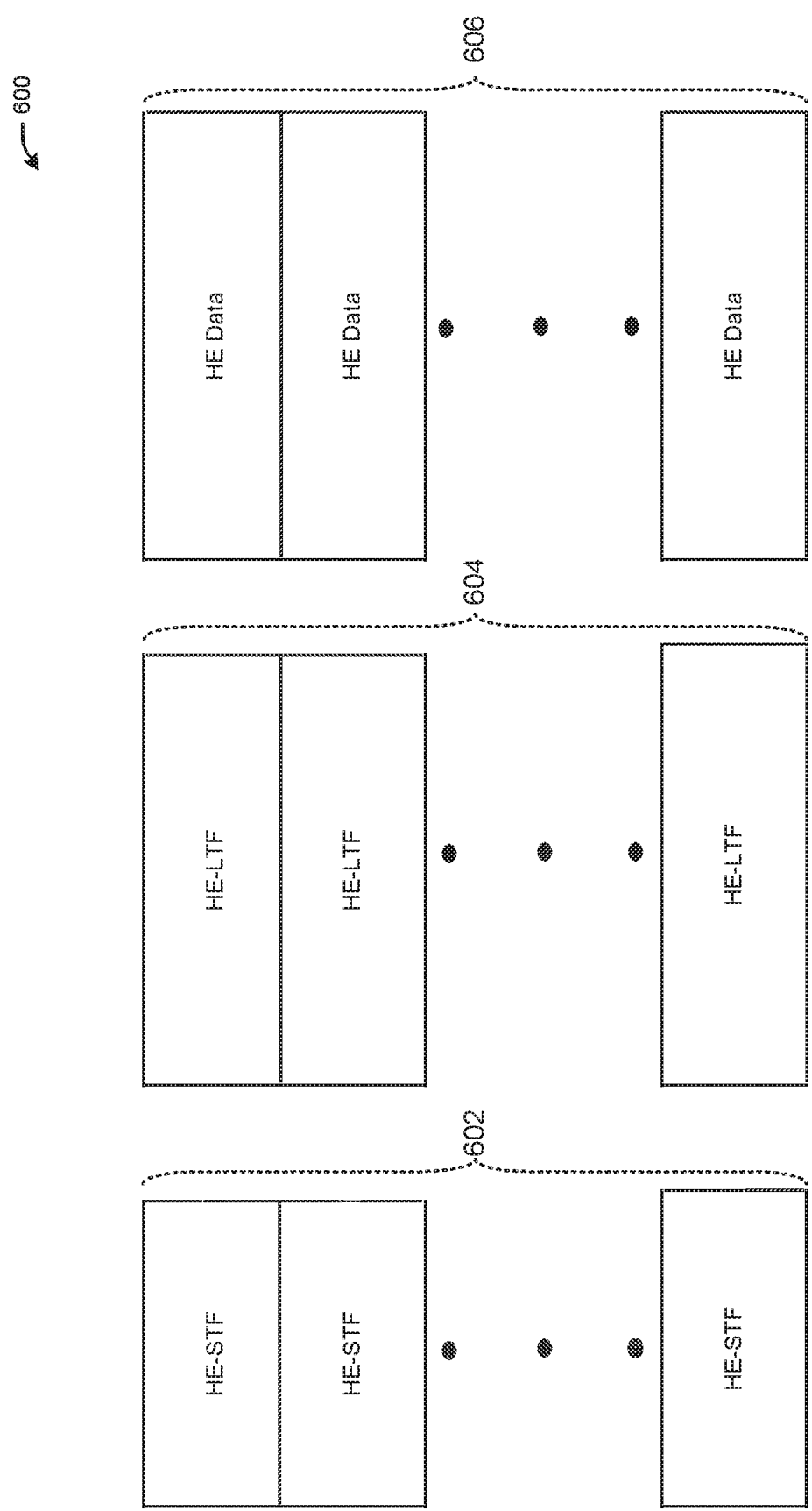
FIG. 6 depicts an illustrative schematic diagram of an uplink bandwidth request, in accordance with one or more embodiments of the disclosure.
Figure 7:
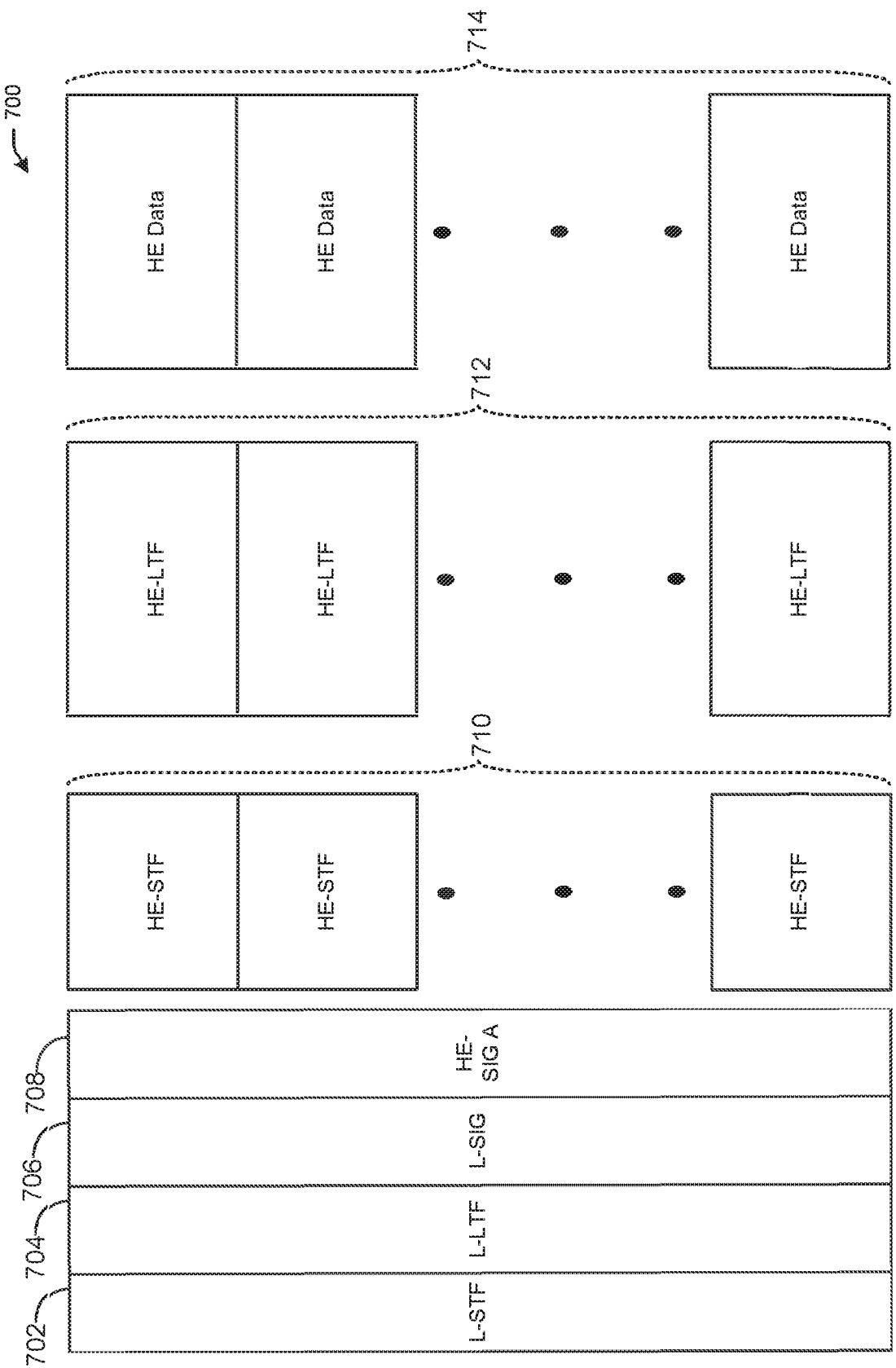
FIG. 7 depicts an illustrative schematic diagram of an uplink bandwidth request, in accordance with one or more embodiments of the disclosure.

In some embodiments, the uplink bandwidth request may have a data field (e.g., HE data 606 and HE data 714) as illustrated in FIGS. 6 and 7. The data field may indicate the bandwidth size requested and/or part of the device ID associated with the device transmitting the uplink bandwidth request. The data field may also contain a value corresponding to the urgency of the request. For example, if a wireless device happens to be an Internet Protocol (IP) phone sending an uplink bandwidth request to connect the IP phone to an emergency telephone number (e.g., 911 or 112), then the AP may accept the IP phone's uplink request prior to accepting another request for access to a webpage (e.g., The Wall Street Journal). The HE-STFs 602 and the HE-LTFs 604 may be equivalent to the HE-STFs 302, 408 and 510 from FIGS. 3, 4 and 5 respectively. The HE-LTFs 604 may be equivalent to HE-LTFs 304, 410, and 512 of FIGS. 3, 4, and 5 respectively. The L-STF 702, L-LTF 704, L-SIG 706, and HE-SIG-A 708 may be equivalent to L-STF 502, L-LTF 504, L-SIG 506, and HE-SIG-A 508 of FIG. 5.

Figure 8:
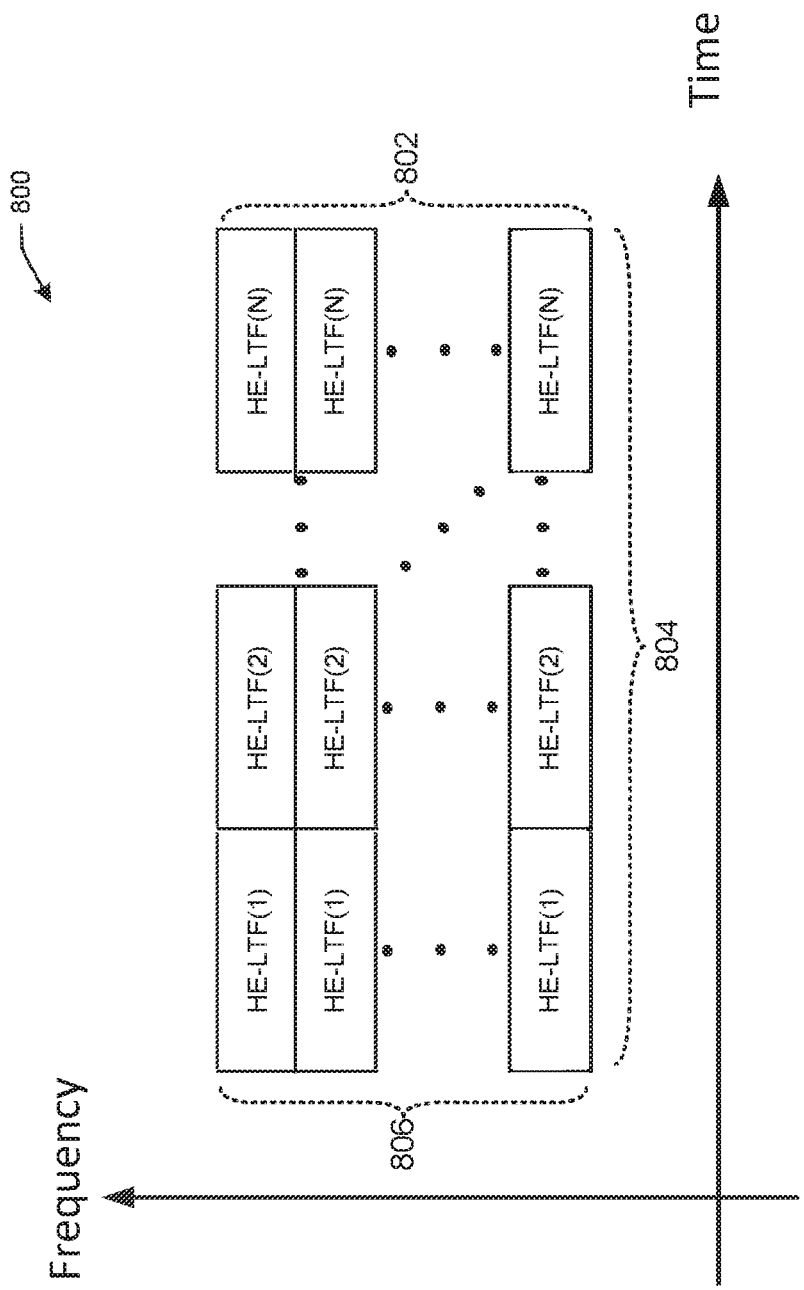
FIG. 8 depicts an illustrative schematic diagram of channel training fields indexed by frequency and time, in accordance with one or more embodiments of the disclosure.

FIG. 8 depicts an illustrative schematic diagram of channel training fields indexed by frequency and time, in accordance with one or more embodiments of the disclosure. In particular, FIG. 8 illustrates a frequency-time-code assignment 800 of at least one RU from RUs 802 from a frequency subchannel (not shown) and at least one OFDMA symbol from the OFDMA symbols 804 to at least one HE-LTF. RUs 802 correspond to each column of the frequency-time-code assignment 800. The frequency-time-code assignment 800 may represent the RUs and OFDMA symbols that may be used by a device requesting an uplink bandwidth request. In some embodiments, a 20 MHz subchannel may be divided into multiple RUs from which a device may select to send an uplink bandwidth request. For instance, HE-LTFs 304, 410, 512, 604, 712 of FIGS. 3, 4, 5, 6 and 7, respectively, may correspond to a subset of RUs from the RUs 802 for a given OFDMA symbol from the OFDMA symbols 804. For example, HE-LTFs 410 of FIG. 4 may correspond to the RUs 806 which are a subset (i.e., the first column) of all the RUs 802 in the frequency-time-code assignment 800 and the OFDMA symbol assigned to HE-LTF(1).

A contention resource element (CRE) may be included in an HE-LTF, and may carry a signal for identifying the requesting devices by the AP. For example, a code in the frequency domain and/or time domain can be sent in the CRE. The frequency and/or time location of the CRE and the code in the CRE can be associated with the requesting devices ID and/or other information such as the requested bandwidth size. The code may be one row or column of a P-matrix. The P-matrix can be replaced by other (orthogonal) matrices such as a Hadamard matrix or discrete Fourier transform (DFT) matrix or any of its variants. The code may be sent in the frequency domain (e.g., as in a DensiFi framework for uplink MU-MIMO transmission). Alternatively, or additionally, the code can be sent in the time domain using regular MIMO.

As explained above, the frequency band may be divided into RUs, and OFDMA symbols across time. Each RU in each OFDMA symbol can carry multiple codes (e.g., up to eight codes). The code can be sent in the frequency domain across subcarriers. Another code can be sent in the time domain across multiple OFDMA symbols. Namely, each device can pick a CRE from a frequency-time code domain to signal its request to an AP for an uplink bandwidth request. The codes are spread across time and/or frequency.

In some embodiments, the selection of the CRE can be related to the device ID, and in other embodiments the selection may be random. If the device randomly selects a CRE, the CRE index may be the temporary ID of the device during the uplink bandwidth request process. For example, the AP detects energy on the randomly selected CRE and uses the index of the CRE in the subsequent scheduling frame for assigning uplink resources to the requesting device. The RUs may be represented by the columns corresponding to the HE-LTFs in FIG. 8. Each RU can be encoded in one or more OFDMA symbols.

As explained above, when the AP receives signals from multiple devices, it needs to set its AGC according to the channel gains for each device. For example, the channel gains experienced by a signal sent from user devices 124, 126, and 128 to AP 102 may correspond to channel gains A, B, and C respectively. There may be a single channel tap for each channel. If user devices 124, 126, and 128 are in close proximity to AP 102, the arrival times of their signals are approximately the same. In this case, if the signals (e.g., HE-STFs and L-SIGs) are sent using a waveform that is a function of time (e.g., x(t)), then the received signal may be the sum of the product of the channel gain and waveform of all the transmitted signals (e.g., [A+B+C]x(t)). Therefore the channel gain may be A+B+C. This may be generalized to m different user devices (UDs) (i.e., $UD_1$, $UD_2$, $UD_3$, $UD_m$) with m unique channel gains (CGs) (i.e., the received signal may be $\Sigma_{i=1}^{m}[CG_{UD_i}]x(t)$), wherein m is a natural number. The channel gains may be random values, and therefore the sum of the channel gains may be added constructively or destructively at the AP 102. The signals transmitted after the HE-STF phase contain information necessary for the AP 102 to determine which devices are transmitting uplink bandwidth requests. Because the waveform used by the devices to transmit the remaining fields after the HE-STF phase, the AP 102 may set its AGC according to the sum of the power of the user devices, or the square root of the sum of the squares of the channel gains associated with each user device (i.e., $\sqrt{a^2+b^2+c^2}$) instead of the sum of the channel gains (e.g., a+b+c). In other words, the AP 102 may need to measure the total received power of the devices' signals instead of the superimposed magnitude. Consequently the devices must send different signals during the HE-STF phase.

In some embodiments, the user devices may use cyclic shift diversity (CSD) values to generate different signals for the HE-STF during the HE-STF phase. For example, each user device may be assigned a different orthogonal code (e.g., a P-matrix code) in time and/or frequency, and each code may be associated with a different CSD value. In some embodiments, the CSD values used in the IEEE 802.11n and IEEE 802.11ax standard may be used. Each code in each frequency-time-code resource may be associated with a different CSD value. For the same frequency RU or CREs in the same frequency RU, the CREs in time and/or frequency domains may be associated with different CSD values. For example, for eight user devices in the same frequency RU with eight different codes in the time domain, the CSD values of the HE-STF phase may be (0, −400, −200, −600, −350, 650, −100, −750) nanoseconds as defined in the IEEE 802.11 ac standard. The user device using the first code or a spatial stream 1 should use 0 nanoseconds, and the user device using the second code or a spatial stream 2 should use −400 nanoseconds.

In some embodiments, each user device may have multiple antennas, thereby requiring additional CSD values. The CSD values defined in IEEE 802.11ac and/or IEEE 802.11n may be used. In other embodiments, the CSD values below may be used. For example, a user device may have six antennas and it may use the fifth code or spatial stream 5. The corresponding CSD value for its first antenna may be −350 nanoseconds, and the remaining antennas on the user device may sequentially select CSD values from a per-antenna CSD table (e.g., 0, −200, −25, −150, −175, −125), and apply them to a modulus operator to generate the corresponding CSD values. Returning to the example, the CSD values for the remaining antennas may be equal to the modulus of −350 with each value in the per-antenna CSD table above (e.g., −mod((350+[200, 25, 150, 175, 125]), 750)=−550, 375, 500, 525, and 475 nanoseconds). Because each user device maintains a clock that is synchronized with the AP, assigning different CSD values enables each user device to transmit an HE-STF without it colliding with another user HE-STF. Consequently, the AP may distinguish each user device based on the timing with which it receives the HE-STF which corresponds to the time in which each user device transmits its HE-STF.

In other embodiments, there may be two different sets of CSD values: one for different spatial streams and the other for different antennas on the same user device. The user device may first look up a per-stream CSD table for a global CSD shift value for all of its antennas and then use a per-antenna CSD table to transmit an HE-STF. The CSD value of each antenna may be determined by both the per-stream CSD table and the per-antenna CSD table. The CSD value from the per-antenna CSD table may be added to the global CSD shift value from the per-stream CSD table. If the sum of the two exceeds the range of the CSD values, a modulus operation may be used to fold the sum back into the CSD value range.

Referring back to the example of FIG. 5, the L-SIG 506 may be used by legacy user devices in an overlapping basic service set (OBSS) to receive signals. Different CSD values may be needed for the legacy user devices to send the L-STF 502, the L-LTF 504, the L-SIG 506, and the HE-SIG-A 508 since the user devices do not leverage a frequency-time-code assignment (e.g., the frequency-time-code 800) to distinguish one user device's transmission from another. Since the bandwidth of the L-STF 502, the L-LTF 504, the L-SIG 506, and the HE-SIG-A 508 may be 20 MHz, which differs from the RU size in the HE-STFs 510 and the HE-LTFs 512, the CSD values used in the L-STF 502, the L-LTF 504, the L-SIG 506, and the HE-SIG-A 508 may be different from those used in the HE-STFs 510 and the HE-LTFs 512. In some embodiments, the user devices may randomly pick CSD values for the L-STF 502, the L-LTF 504, the L-SIG 506, and the HE-SIG-A 508. In other embodiments, the user devices may reuse the CSD values associated with the code, the RU location, and/or the CRE location used in the request phase (i.e., HE-LTF). If frequency domain codes are used, the CSD values of different user devices may be the same for the same RU because the CSD values may degrade the orthogonality of the codes across the frequency.

In some embodiments in which devices are communicating with an AP, and have line of sight with an AP, there may be some devices that are farther away from the AP than other devices, and therefore the path losses experienced by the devices that are farther away may be different than the devices that are closer to the AP. In this case, the devices that are farther away may transmit an uplink bandwidth request with a higher transmit power so that it is successfully received by the AP. As a result, a transmission by the devices closer to the AP may be successfully received, but may interfere with the transmission of other devices that are farther away from the AP, if the devices closer to the AP and the devices farther from the AP are transmitting at the same time. In other scenarios, some devices may have an object obstructing a waveform (i.e., a modulated signal) carrying an uplink bandwidth request being sent to the AP, and therefore the path losses experienced by some of the devices may be different. For instance, some devices may have a line of sight with the AP, and others may not have a line of site with the AP. As a result, the channel estimation parameters may be different and consequently the signal-to-noise ratio (SNR) of the receiver at the AP may be different for the devices that have a line of sight and those that do not have a line of sight. In both scenarios, this may result in some devices unsuccessfully transmitting their uplink bandwidth requests, thereby preventing these devices from communicating with the AP. In order to compensate for this issue, the AP may include a power transmission control field in a trigger frame (e.g., the trigger 104 of FIG. 1) soliciting the uplink bandwidth requests (e.g., the UL bandwidth resource request 106 of FIG. 1) from the devices that it communicates with. For example, the AP may send a trigger frame to solicit uplink bandwidth requests from the devices. After the devices receive the trigger frame, each device sending an uplink bandwidth request may adjust its transmission power so that the received power level at the AP corresponds to a specified power level in the trigger frame. The trigger frame may also include the transmission power level at which the trigger frame was transmitted from the AP to the devices, thereby enabling the devices to calibrate their receivers by generating an estimate of the channel. Because each station may adjust its transmission power to a unique transmission power level, the AP will be able to detect the uplink bandwidth requests from the different devices, without some devices' uplink bandwidth requests going undetected. For example, if a first device transmits an uplink bandwidth request at a first transmission power level, and a second device transmits an uplink bandwidth request at a second transmission power level, wherein the first and second transmission power levels are not the same, the AP may successfully receive both uplink bandwidth requests. In some embodiments, the AP may be able to assign a transmission power level per device such that the power level detected by a receiver in the AP may enable the AP to determine which device has transmitted an uplink bandwidth request. For instance, a processor in the AP may develop a bijective relationship between each device communicating with the AP that may submit an uplink bandwidth request and a transmission power level such that each device has a unique transmission power level assigned to it. It is understood that the above descriptions are for purposes of illustration and are not meant to be limiting.

Figure 9:
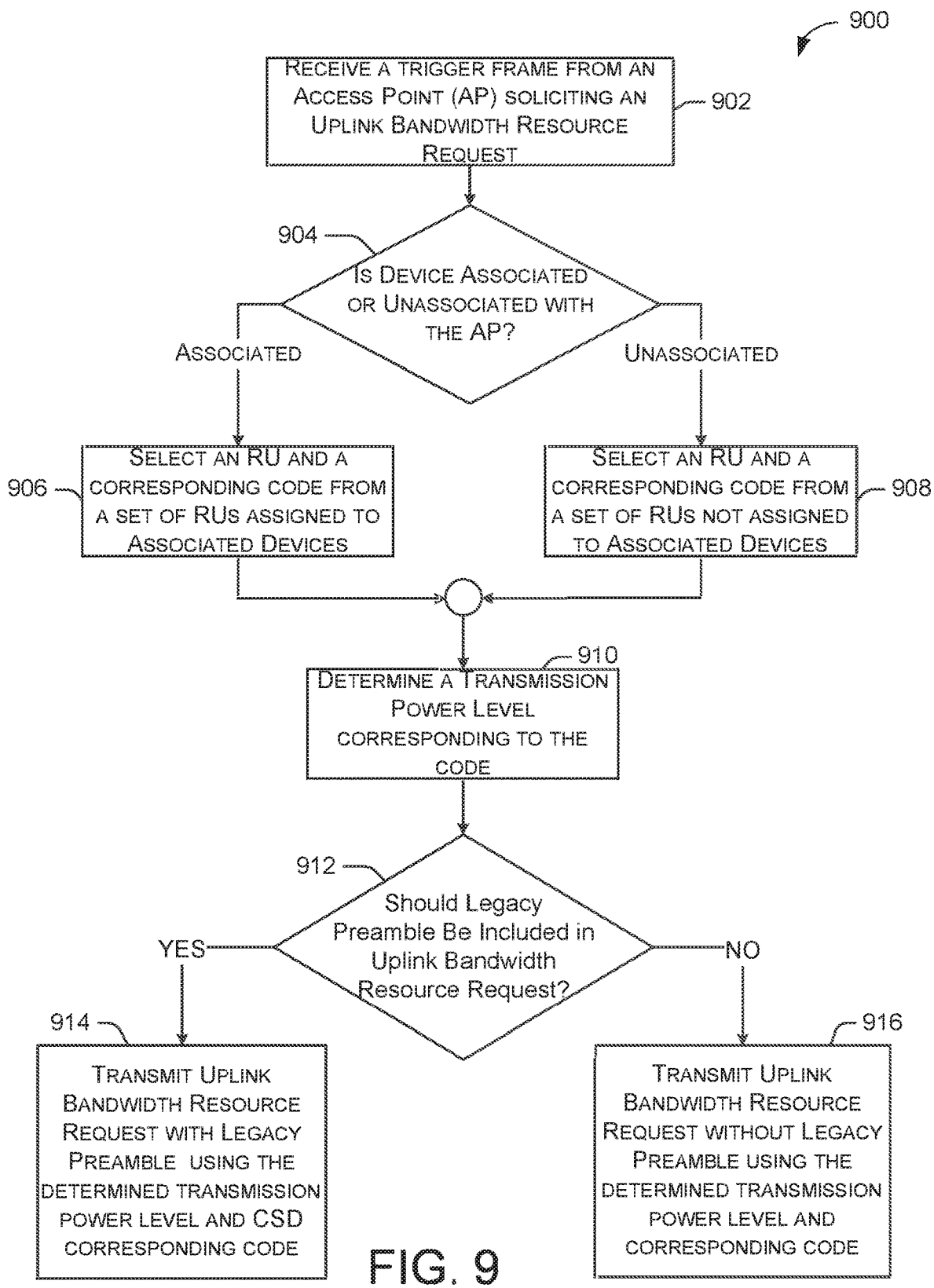
FIG. 9 depicts a flow diagram of an illustrative process of a device transmitting an uplink bandwidth resource request from an access point (AP), in accordance with one or more embodiments of the disclosure.

FIG. 9 depicts a flow diagram of an illustrative process of a device transmitting an uplink bandwidth resource request from an AP, in accordance with one or more embodiments of the disclosure. The flow diagram may be a method implemented by at least one processor on a user device (e.g., the user devices 124, 126, or 128 of FIG. 1) to generate a signal that may be used to transmit an uplink bandwidth resource request. In particular, FIG. 9 illustrates a sequence of steps that may be executed, in the form of computer readable instructions, by a processor in the user device, to implement an uplink bandwidth resource request as described below. The instructions may or may not be executed in the same sequence as illustrated in FIG. 9.

At block 902, the processor may receive a trigger frame (e.g., the trigger 104 of FIG. 1) from an AP (e.g., the AP 102 of FIG. 1) soliciting an uplink bandwidth resource request. The trigger frame may comprise a field indicating to the user device that a time period for requesting uplink bandwidth resource requests has been initiated by the AP. In some embodiments, the user device may detect energy and/or power on a given frequency which may be reserved for indicating to the device that the time period for requesting uplink bandwidth resource requests has begun. In some embodiments, the trigger frame may also solicit power saving poll information and/or channel assessment information from the user device along with the uplink bandwidth resource requests. For instance, the trigger frame may comprise a first field for soliciting uplink bandwidth resource requests, a second field for soliciting power saving (PS)-poll information, and a third field for soliciting channel assessment information. If the trigger frame comprises the second field for soliciting PS-poll information from the device, the PS-poll field may be sent to determine which devices are in a power save state and which devices are not in a power save state. If the trigger frame comprises the third field for soliciting channel assessment information, the channel assessment information requested from the device may include any channel estimates generated by the device (e.g., measurement of the impulse response of the channel between the AP and the device). In some embodiments, the user device may detect energy and/or power on a given frequency which may be reserved for indicating to the device what information is being solicited in the trigger frame (e.g., an uplink bandwidth resource request, PS-poll information, and/or channel assessment information).

At block 904, the processor may then determine if the user device is associated with the AP or unassociated with the AP. A device may be associated with an AP if it belongs to a service set with a corresponding association identifier (AID) assigned to it. If the device is associated with the AP, the processor may select an RU and a corresponding code from a set of RUs assigned to associated devices (block 906). The set of RUs assigned to associated devices may be a subset of the frequencies over which the RUs may be assigned in a frequency-time-code assignment (e.g., the frequency-time-code assignment 800 of FIG. 8). For instance, a 20 MHz bandwidth may be divided into nine RUs. Six RUs may be reserved for associated devices to transmit uplink bandwidth resource requests, and the remaining three RUs may be reserved for unassociated devices to transmit uplink bandwidth resource requests. As an example, the RUs 806 of FIG. 8 may comprise nine RUs spanning a 20 MHz bandwidth, resulting in each RU comprising 2 MHz of bandwidth. And a corresponding OFDMA symbol may be represented by HE-LTF(1) from the OFDMA symbols 804 of FIG. 8. The processor in an associated device may select from the RUs corresponding to the first nine RUs starting from the topmost RU of RUs 806 to the ninth RU of RUs 806. The remaining three RUs starting at the seventh RU of RUs 806 to the bottom most RU of RUs 806 may be used for unassociated devices. A code corresponding to the RU, or the location of the RU in the total allocable bandwidth (e.g., 20 MHz), may be used by the processor to select an RU. For example, a first code may correspond to the location of the first RU, and a second code may correspond to the location of the second RU, etc.

If the device is unassociated, the processor may randomly select an RU and a code corresponding to the RU from a set of RUs not assigned to the associated devices (block 908). Returning to the example above, one of the three remaining RUs of the RUs 806 may be randomly selected by the processor to transmit its uplink bandwidth resource request on OFDMA symbol HE-LTF(1).

Additionally, and/or alternatively, a code may be transmitted in an OFDMA symbol, as explained above, corresponding to a set of RUs. For example, a code may be transmitted corresponding to the OFDMA symbol associated with HE-LTF(1) of the OFDMA symbols 804 of FIG. 8 and an RU from the RUs 806 of FIG. 8. Thus instead of a code being transmitted corresponding to the RU, a code may be sent corresponding to the OFDMA symbol associated with the RU, or the code corresponding to the RU may be sent in addition to a code corresponding to the OFDMA symbol. This may be referred to as a frequency-time-code, wherein the code corresponding to the RU is a frequency code sent across at least one subcarrier in a frequency domain, and the code corresponding to the OFDMA symbol is a time code sent across at least one OFDMA symbol in a time domain.

After the processor selects the RU and corresponding code, the processor may determine a power transmission level, at block 910, that the device must transmit its uplink bandwidth resource request to which corresponds to the code selected in either block 906 or block 908. After determining the transmission power level, the processor may then determine if a legacy preamble should be included in the uplink bandwidth resource request in block 912. The processor may determine whether or not a legacy preamble should be sent to the AP based on whether or not the device is a legacy device or an HE device. If the device is a legacy device, the processor may transmit the uplink bandwidth resource request in an L-LTF (e.g., the L-LTF 404 of FIG. 4) within a legacy preamble comprising an L-STF, an L-LTF, and an L-SIG (e.g., the L-STF 402, the L-LTF 404, and the L-SIG 406 of FIG. 4) using the determined transmission power level and a CSD corresponding to the code (block 914). In some embodiments, the processor may randomly select a CSD value, as explained above, for the L-LTF. For instance, a set of RUs, comprising at least one RU, may be reserved for the processor to use to send its uplink bandwidth resource requests. In particular, the processor may use an RU that is used simultaneously by other legacy devices to send its uplink bandwidth resource request. Each device may randomly select and use a unique CSD value, separated in time, to prevent collisions of the L-LTFs. Accordingly the processor may randomly select, or be assigned, a CSD value based on a synchronization of the processor's clock with the AP to prevent the processor from transmitting an L-LTF at the same time the other device's processors may transmit an L-LTF.

If the device is an HE device, then the processor may transmit the uplink bandwidth resource request without the legacy preamble using the determined transmission power level and the corresponding code in an HE-LTF (e.g., one of the HE-LTFs 410 of FIG. 4) (block 916). In some embodiments, the processor may execute computer-readable instructions corresponding to block 912 before block 904 or after block 904 and before block 910. It is understood that the above descriptions are for purposes of illustration and are not meant to be limiting.

Figure 10:
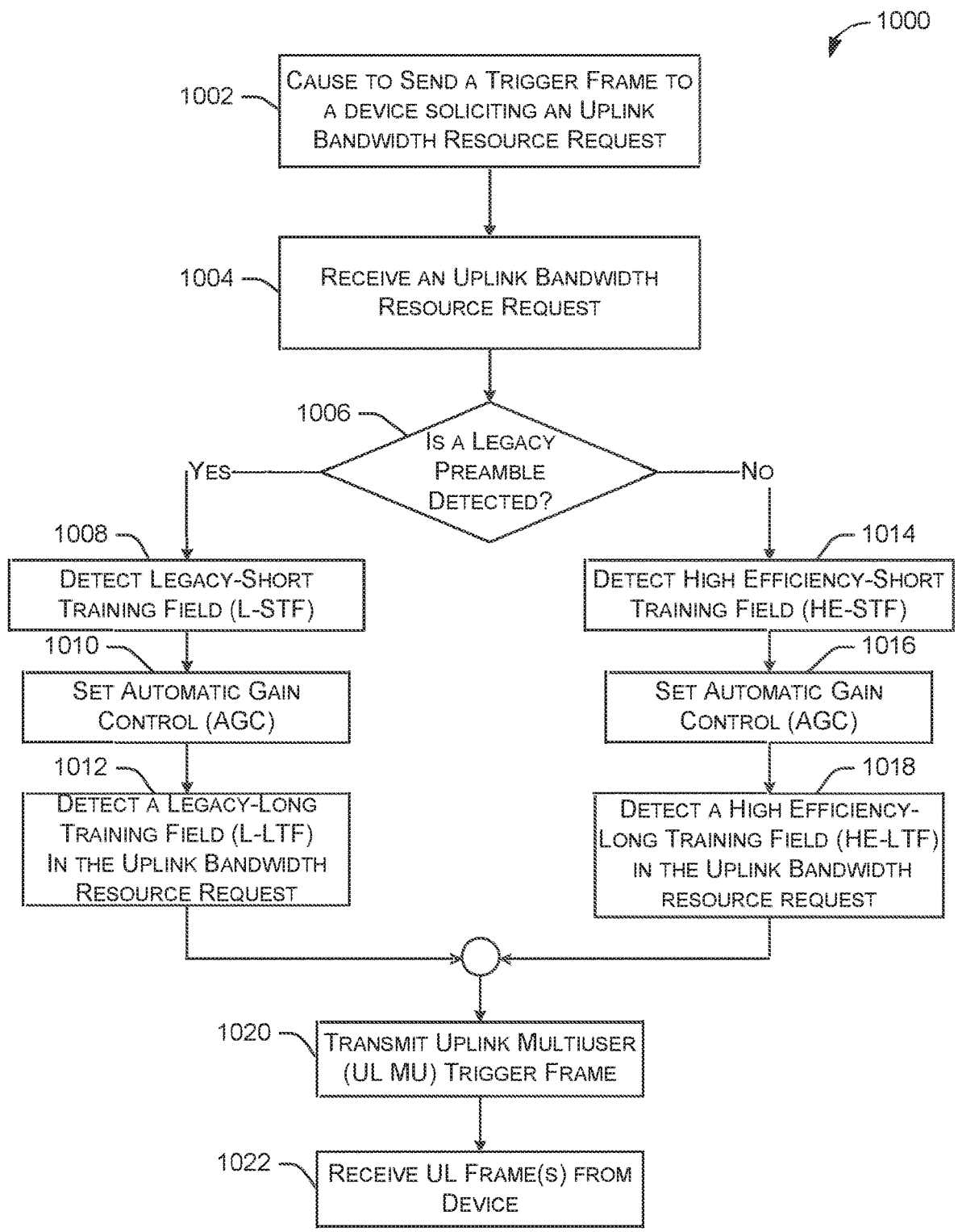
FIG. 10 depicts a flow diagram of an illustrative process of an AP detecting and processing an uplink bandwidth resource request from a device, in accordance with one or more embodiments of the disclosure.

FIG. 10 depicts a flow diagram of an illustrative process of an AP detecting and processing an uplink bandwidth resource request from a device, in accordance with one or more embodiments of the disclosure. In particular, FIG. 10 illustrates a sequence of steps that may be executed, in the form of computer-readable instructions, by a processor in the AP, to detect and process an uplink bandwidth resource request received from a device as described below. The instructions may or may not be executed in the same sequence as illustrated in FIG. 9.

At block 1002, a processor in the AP (e.g., the AP 102 of FIG. 1) may execute computer-readable instructions that cause it to send a trigger frame to a device soliciting an uplink bandwidth resource request from a device. After transmitting the trigger frame, the AP may receive an uplink bandwidth resource request from the device at block 1004 and may determine if a legacy preamble is detected in the bandwidth resource request (block 1006). The legacy preamble may comprise an L-STF, an L-LTF, and an L-SIG (e.g., the L-STF 402, the L-LTF 404, and the L-SIG 406 of FIG. 4) as described above. If a legacy preamble is detected, the processor may detect energy and/or power on the L-STF at block 1008, and set an automatic gain control (AGC) of a transceiver electronically coupled to the processor at block 1010. The L-STF may comprise at least one signal that the transceiver can use to train itself (i.e., set the AGC) to recognize signals from the device that it received the legacy preamble from. After setting the AGC, the processor may detect energy and/or power corresponding to the L-LTF in the uplink bandwidth resource request (block 1012). As explained above, the CSD values may be used by legacy devices to transmit portions of the legacy preamble (e.g., the L-STF and the L-LTF). In particular, the processor may receive a first CSD value corresponding to the L-STF and a second CSD value corresponding to the L-LTF. In some embodiments, the CSD value may be associated with a code or an RU location or CRE location used by HE devices to transmit an HE-LTF.

If a legacy preamble is not detected at block 1006, the processor may detect energy and/or power on an HE-STF (e.g., one of the HE-STFs 710 of FIG. 7) (block 1014). The HE-STF may comprise at least one signal that the transceiver can use to train itself (i.e., set the AGC) to recognize signals from the device based on the HE-STF. The processor may set the AGC after receiving the HE-STF (block 1016). In some embodiments, the processor may use the CSD values to set the AGC as explained above. After setting the AGC, the processor may detect energy and/or power corresponding to an HE-LTF in the uplink bandwidth resource request at block 1018 and a code corresponding to an RU on which the uplink bandwidth resource request was transmitted and received. The uplink bandwidth resource request may be received with a certain power level corresponding to the code. The code may correspond to the RUs associated with an associated device or an unassociated device. Thus a first set of codes may correspond to RUs associated with associated devices and a second set of codes may correspond to RUs associated with unassociated devices.

Additionally, and/or alternatively, a code may be received in an OFDMA symbol as explained above corresponding to a set of RUs. For example, a code may be received corresponding to the OFDMA symbol associated with HE-LTF(1) of the OFDMA symbols 804 and an RU from the RUs 806 of FIG. 8. Thus instead of a code being received corresponding to the RU, a code may be received corresponding to the OFDMA symbol associated with the RU, or the code corresponding to the RU may be received in addition to a code corresponding to the OFDMA symbol. This may be referred to as a frequency-time-code, wherein the code corresponding to the RU is a frequency code sent across at least one subcarrier in a frequency domain, and the code corresponding to the OFDMA symbol is a time code sent across at least one OFDMA symbol in a time domain.

After an uplink bandwidth resource request is detected in an L-LTF at block 1012 or in an HE-LTF at block 1018, the processor may transmit an UL MU trigger frame at block 1020 to initiate a data transmission phase by the device. At block 1022, the processor may receive at least one UL frame from the device comprising data transmitted by the device (e.g., one of the HE data 606 of FIG. 6 or the HE data 714 of FIG. 7). It is understood that the above descriptions are for purposes of illustration and are not meant to be limiting.

FIG. 11 shows a functional diagram of an exemplary communication station 1100 in accordance with some embodiments. In one embodiment, FIG. 11 illustrates a functional block diagram of a communication station that may be suitable for use as an AP 102 (FIG. 1) or a user device 120 (FIG. 1) in accordance with some embodiments. The communication station 1100 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1100 may include communications circuitry 1102 and a transceiver 1110 for transmitting and receiving signals to and from other communication stations using one or more antennas 1101. The communications circuitry 1102 may include circuitry that can operate the physical layer (PHY) communications and/or medium access control (MAC) communications for controlling access to the wireless medium, and/or any other communications layers for transmitting and receiving signals. The communication station 1100 may also include processing circuitry 1106 and memory 1108 arranged to perform the operations described herein. In some embodiments, the communications circuitry 1102 and the processing circuitry 1106 may be configured to perform the operations detailed in FIGS. 2-10.

In accordance with some embodiments, the communications circuitry 1102 may be arranged to contend for a wireless medium and configure frames or packets for communicating over the wireless medium. The communications circuitry 1102 may be arranged to transmit and receive signals. The communications circuitry 1102 may also include circuitry for modulation/demodulation, upconversion/downconversion, filtering, amplification, etc. In some embodiments, the processing circuitry 1106 of the communication station 1100 may include one or more processors. In other embodiments, two or more antennas 1101 may be coupled to the communications circuitry 1102 arranged for sending and receiving signals. The memory 1108 may store information for configuring the processing circuitry 1106 to perform operations for configuring and transmitting message frames and performing the various operations described herein. The memory 1108 may include any type of memory, including non-transitory memory, for storing information in a form readable by a machine (e.g., a computer). For example, the memory 1108 may include a computer-readable storage device, read-only memory (ROM), random-access memory (RAM), magnetic disk storage media, optical storage media, flash-memory devices and other storage devices and media.

In some embodiments, the communication station 1100 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1100 may include one or more antennas 1101. The antennas 1101 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1100 may include one or more of a keyboard, a display, a non-volatile memory port, multiple antennas, a graphics processor, an application processor, speakers, and other mobile device elements. The display may be an LCD screen including a touch screen.

Although the communication station 1100 is illustrated as having several separate functional elements, two or more of the functional elements may be combined and may be implemented by combinations of software-configured elements, such as processing elements including digital signal processors (DSPs) and/or other hardware elements. For example, some elements may include one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements of the communication station 1100 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1100 may include one or more processors and may be configured with instructions stored on a computer-readable storage device.

FIG. 12 illustrates a block diagram of an example of a machine 1200 or system upon which any one or more of the techniques (e.g., methodologies) discussed herein may be performed. In other embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environments. The machine 1200 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208. The machine 1200 may further include a power management device 1232, a graphics display device 1210, an alphanumeric input device 1212 (e.g., a keyboard), and a user interface (UI) navigation device 1214 (e.g., a mouse). In an example, the graphics display device 1210, the alphanumeric input device 1212, and the UI navigation device 1214 may be a touch screen display. The machine 1200 may additionally include a storage device (i.e., drive unit) 1216, a signal generation device 1218 (e.g., a speaker), an OFDMA uplink resource allocation device 1219, a network interface device/transceiver 1220 coupled to antenna(s) 1230, and one or more sensors 1228, such as a global positioning system (GPS) sensor, a compass, an accelerometer, or other sensor. The machine 1200 may include an output controller 1234, such as a serial connection (e.g., universal serial bus (USB), parallel, or other wired or wireless (e.g., infrared (IR), near field communication (NFC), etc.) to communicate with or control one or more peripheral devices (e.g., a printer, a card reader, etc.)).

The storage device 1216 may include a machine-readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within the static memory 1206, or within the hardware processor 1202 during execution thereof by the machine 1200. In an example, one or any combination of the hardware processor 1202, the main memory 1204, the static memory 1206, or the storage device 1216 may constitute machine-readable media.

The OFDMA uplink resource allocation device 1219 may carry out or perform any of the operations and processes described and shown above. For example, the OFDMA uplink resource allocation device 1219 may be configured to enable a two-phase UL MU transmission, a resource allocation phase, and a data transmission phase. The first phase (resource request phase) may be triggered by the AP, where the AP may ask devices to send a specific signal with UL OFDMA if they want to have a transmit opportunity in the second phase or in future UL MU transmissions. The characteristics of the signal sent by the devices may enable the AP to identify the devices if they are associated devices or know that unassociated devices sent a signal with random characteristics. The OFDMA uplink resource allocation device 1219 may be configured to define the signal as a code sequence (line of the P-matrix) of the HE-LTF, sent on only a resource unit in frequency (26 tones allocation) using UL OFDMA. This combination of a code and frequency resource unit may have an ID, which is called the resource block ID (RBID). The energy detection of code and frequency unit (RBID) enables the AP to know the identity of the device. The AP can acknowledge to the devices that it received the resource requests. The second phase is a regularly scheduled UL MU transmission, which starts with a trigger frame sent by the AP, announcing the identity of the devices that will transmit in the UL MU transmission, and other information like the allocated resources.

While the machine-readable medium 1222 is illustrated as a single medium, the term "machine-readable medium" may include a single medium or multiple media (e.g., a centralized or distributed database, and/or associated caches and servers) configured to store the one or more instructions 1224.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM), random access memory (RAM), magnetic disk storage media, optical storage media, a flash memory, etc.

The term "machine-readable medium" may include any medium that is capable of storing, encoding, or carrying instructions for execution by the machine 1200 and that cause the machine 1200 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only Memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device/transceiver 1220 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone service (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1220 may include one or more physical jacks (e.g., Ethernet, coaxial, or phone jacks) or one or more antennas to connect to the communications network 1226. In an example, the network interface device/transceiver 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1200 and includes digital or analog communications signals or other intangible media to facilitate communication of such software.

In example embodiments of the disclosure, there may be an access point, comprising at least one memory storing computer-executable instructions; and at least one processor configured to access the at least one memory, wherein the at least one processor is configured to execute the computer-executable instructions to cause to send a trigger frame to a first device; receive an uplink bandwidth resource request from the first device, in response to sending the trigger frame; determine a high efficiency-long training field (HE-LTF) in the uplink bandwidth resource request; cause to send an uplink multiuser trigger frame; and identify an uplink frame received from the first device.

Implementations may include one or more of the following features. In some implementations, the access point may comprise at least one transceiver configured to transmit and receive wireless signals. The access point may comprise at least one antenna coupled to the at least one transceiver configured to dissipate and detect electromagnetic energy associated with transmitting the wireless signals and receiving the wireless signals respectively.

The at least one processor of the access point may be configured to execute the computer-executable instructions to determine a high efficiency-short training field (HE-STF) in the uplink bandwidth resource request from the first device. The at least one processor may be further configured to execute the computer-executable instructions to set an automatic gain control (AGC) based at least in part on the HE-STF. The HE-LTF may be received on a resource unit (RU) with a corresponding frequency code. The HE-LTF may be received on an RU associated with a time code corresponding to at least one orthogonal frequency division multiple access (OFDMA) symbol.

In some example embodiments, there may be a non-transitory computer-readable medium storing computer-executable instructions which when executed by at least one processor results in performing operations comprising: causing to send a trigger frame to a first device; receiving an uplink bandwidth resource request from the first device, in response to sending the trigger frame; determining a high efficiency-long training field (HE-LTF) in the uplink bandwidth resource request; causing to send an uplink multiuser trigger frame; and identifying a UL frame from the first device.

Implementations may include one or more of the following features. The at least one processor may be configured to execute the computer-executable instructions to determine a high efficiency-short training field (HE-STF) in the uplink bandwidth resource request from the first device. The at least one processor may be configured to execute the computer-executable instructions to set an automatic gain control (AGC) based at least in part on the HE-STF. The HE-LTF may be received on a resource unit (RU) with a corresponding frequency code. The HE-LTF may be received on an RU associated with a time code corresponding to at least one orthogonal frequency division multiple access (OFDMA) symbol.

In some example embodiments, there may be a device comprising at least one memory storing computer-executable instructions; and at least one processor configured to access the at least one memory, wherein the at least one processor is configured to execute the computer-executable instructions to receive a trigger frame from an access point (AP); determine that the device is associated with the AP; select a resource unit (RU) and a corresponding code from a set of RUs assigned to associated devices; determine a transmission power level corresponding to the code; and transmit the uplink bandwidth resource request.

Implementations may include one or more of the following features. The device may further comprise at least one transceiver configured to transmit and receive wireless signals. The device may further comprise at least one antenna coupled to the at least one transceiver configured to dissipate and detect electromagnetic energy associated with transmitting the wireless signals and receiving the wireless signals respectively.

The HE-LTF may be transmitted in an uplink bandwidth request. The at least one processor of the device may be further configured to execute the computer-executable instructions to cause the at least one processor to transmit the HE-LTF using the RU. The corresponding code may be transmitted in the HE-LTF. The at least one processor may be further configured to execute the computer-executable instructions to cause the at least one processor to transmit an HE-STF. The at least one processor may be further configured to execute the computer-executable instructions to cause the at least one processor to transmit the HE-STF using a cyclic shift diversity (CSD) value.

In some example embodiments, there may be a non-transitory computer-readable medium storing computer-executable instructions which when executed by at least one processor results in performing operations comprising receiving a trigger frame from an AP for an uplink bandwidth resource request; determining that a device is associated with the AP; selecting an RU and a corresponding code from a set of RUs assigned to associated devices; determining a transmission power level corresponding to the code; determining that a legacy preamble should not be included in the uplink bandwidth resource request; and transmitting the uplink bandwidth resource request.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device for soliciting uplink multiuser transmissions, the device comprising processing circuitry coupled to storage, the processing circuitry configured to:
   determine a trigger frame associated with one or more resource allocations, wherein the trigger frame indicates a plurality of resource units (RUs);
   determine a first transmission power level and a second transmission power level corresponding to the trigger frame;
   allocate a first RU to a first station device and a second RU to a second station device;
   cause to send the trigger frame to the first station device and to the second station device, wherein the trigger frame comprises a first indication of the first transmission power level, a second indication of the first RU, a third indication of the second transmission power level, and a fourth indication of the second RU, and wherein the first RU is different from the second RU;
   identify an uplink frame, of the multiuser transmissions, received from the first station device, wherein the uplink frame is an uplink bandwidth resource request comprising a high efficiency-long training field (HE-LTF), and wherein the high efficiency-long training field (HE-LTF) is received at the first RU of the plurality of RUs; and
   wherein the uplink frame comprises a parameter indicating a power level used by the first station device, wherein the power level is based on the first indication of the first transmission power level of the trigger frame.

2. The device of claim 1, wherein the trigger frame comprises an allocation subfield indicating at least one of the one or more resource allocations associated with one or more channels.

3. The device of claim 1, wherein the processing circuitry is further configured to identify a short training field of the uplink frame.

4. The device of claim 1, wherein the first transmission power level is encoded in a subfield of the trigger frame, wherein the subfield indicates a transmission power level for a channel of one or more channels.

5. The device of claim 3, wherein the processing circuitry is further configured to adjust an automatic gain control (AGC) of an antenna of the device based on the short training field.

6. The device of claim 1, further comprising a transceiver configured to transmit and receive wireless signals.

7. The device of claim 6, further comprising an antenna coupled to the transceiver.

8. A non-transitory computer-readable medium storing computer-executable instructions which when executed by one or more processors result in performing operations comprising:
   determining a trigger frame associated with one or more resource allocations, wherein the trigger frame indicates a plurality of resource units (RUs);
   determining a first transmission power level and a second transmission power level corresponding to the trigger frame;
   allocating a first RU to a first station device and a second RU to a second station device;
   causing to send the trigger frame to the first station device and to the second station device, wherein the trigger frame comprises a first indication of the first transmission power level, a second indication of the first RU, a third indication of the second transmission power level, and a fourth indication of the second RU, and wherein the first RU is different from the second RU;
   identifying an uplink frame, of multiuser transmissions, received from the first station device, wherein the uplink frame is an uplink bandwidth resource request comprising a high efficiency-long training field (HE-LTF), and wherein the high efficiency-long training field (HE-LTF) is received at the first RU of the plurality of RUs; and
   wherein the uplink frame comprises a parameter indicating a power level used by the first station device, wherein the power level is based on the first indication of the first transmission power level of the trigger frame.

9. The non-transitory computer-readable medium of claim 8, wherein the trigger frame comprises an allocation subfield indicating at least one of the one or more resource allocations associated with one or more channels.

10. The non-transitory computer-readable medium of claim 8, wherein the operations further comprise identifying a short training field of the uplink frame.

11. The non-transitory computer-readable medium of claim 8, wherein the first transmission power level is encoded in a subfield of the trigger frame, wherein the subfield indicates a transmission power level for a channel of one or more channels.

12. The non-transitory computer-readable medium of claim 10, wherein the operations further comprise adjusting an automatic gain control (AGC) of an antenna based on the short training field.

13. A method comprising:
   determining, by one or more processors, a trigger frame associated with one or more resource allocations, wherein the trigger frame indicates a plurality of resource units (RUs);
   determining a first transmission power level and a second transmission power level corresponding to the trigger frame;
   allocating a first RU to a first station device and a second RU to a second station device;
   causing to send the trigger frame to the first station device and to the second station device, wherein the trigger frame comprises a first indication of the first transmission power level, a second indication of the first RU, a third indication of the second transmission power level, and a fourth indication of the second RU, and wherein the first RU is different from the second RU;
   identifying an uplink frame, of multiuser transmissions, received from the first station device, wherein the uplink frame is an uplink bandwidth resource request comprising a high efficiency-long training field (HE-LTF), and wherein the high efficiency-long training field (HE-LTF) is received at the first RU of the plurality of RUs; and
   wherein the uplink frame comprises a parameter indicating a power level used by the first station device, wherein the power level is based on the first indication of the first transmission power level of the trigger frame.

14. The method of claim 13, wherein the trigger frame comprises an allocation subfield indicating at least one of the one or more resource allocations associated with one or more channels.

* * * * *